(12) United States Patent
Zhou

(10) Patent No.: US 11,648,860 B2
(45) Date of Patent: May 16, 2023

(54) VEHICLE SEAT SIDE PILLOW MOUNTING STRUCTURE AND SEAT SIDE PILLOW ASSEMBLY

(71) Applicant: SHEN ZHEN STAND BY ME TECHNOLOGY LIMITED, Shenzhen (CN)

(72) Inventor: Zhiping Zhou, Huizhou (CN)

(73) Assignee: SHEN ZHEN STAND BY ME TECHNOLOGY LIMITED, Shenzhen (CN)

( * ) Notice: Subject to any disclaimer, the term of this patent is extended or adjusted under 35 U.S.C. 154(b) by 45 days.

(21) Appl. No.: 17/405,299

(22) Filed: Aug. 18, 2021

(65) Prior Publication Data

US 2022/0063468 A1  Mar. 3, 2022

(30) Foreign Application Priority Data

Aug. 31, 2020  (CN) .......................... 202021861979.9

(51) Int. Cl.
  *B60N 2/885* (2018.01)
  *B60N 2/897* (2018.01)
  *B60N 2/815* (2018.01)
  *B60N 2/90* (2018.01)

(52) U.S. Cl.
  CPC ............. *B60N 2/885* (2018.02); *B60N 2/815* (2018.02); *B60N 2/897* (2018.02); *B60N 2002/905* (2018.02)

(58) Field of Classification Search
  CPC ........ B60N 2/885; B60N 2/815; B60N 2/897; B60N 2002/905; B60N 2/882
  See application file for complete search history.

(56) References Cited

U.S. PATENT DOCUMENTS

| | | | | | |
|---|---|---|---|---|---|
| 2,831,530 | A | * | 4/1958 | Chiopelas | B60N 2/818 297/397 |
| 4,971,393 | A | * | 11/1990 | Maisenhalder | B60N 2/882 297/391 |
| 5,868,471 | A | * | 2/1999 | Graham | B60N 2/882 5/640 |
| 8,888,187 | B2 | * | 11/2014 | Albino | B60N 2/885 297/400 |
| 9,701,231 | B2 | * | 7/2017 | Arriola | B60N 2/882 |
| 10,118,526 | B1 | * | 11/2018 | Fan | B60N 2/882 |
| 10,800,307 | B1 | * | 10/2020 | Zhou | B60N 2/99 |

(Continued)

*Primary Examiner* — Philip F Gabler
(74) *Attorney, Agent, or Firm* — WPAT, P.C

(57) ABSTRACT

A vehicle seat side pillow mounting structure is provided and belongs to the field of vehicle parts installation. The mounting structure includes: a connection bar, two ends of the connection bar being disposed with mounting parts for mounting side pillows; two clamping heads, slidably assembled on the connection bar along a lengthwise direction of the connection bar and for clamping and being fixed on two insertion rods of a vehicle headrest; and locking mechanisms, respectively disposed between the clamping heads and the connection bar and for locking the clamping heads on or unlocking the clamping heads from the connection bar. The mounting structure does not require special customization, can reduce the purchase cost, can install the side pillows on other types of seats and has the advantage of strong practicability.

8 Claims, 3 Drawing Sheets

(56) References Cited

U.S. PATENT DOCUMENTS

| | | | | |
|---|---|---|---|---|
| 2013/0068809 A1* | 3/2013 | Wang | ................... | B60R 11/02 |
| | | | | 224/275 |
| 2013/0257114 A1* | 10/2013 | Lee | ................... | B60R 7/043 |
| | | | | 297/188.04 |
| 2018/0370398 A1* | 12/2018 | Chiang | ................ | B60N 2/853 |

* cited by examiner

VEHICLE SEAT SIDE PILLOW MOUNTING STRUCTURE AND SEAT SIDE PILLOW ASSEMBLY

TECHNICAL FIELD

The invention relates to the field of vehicle parts installation, and more particularly to a vehicle seat side pillow mounting structure and a seat side pillow assembly.

DESCRIPTION OF RELATED ART

The use of side pillows together with vehicle seats can provide supports for sides of heads of passengers during driving, especially during long-distance driving and resting, which not only can relieve riding fatigue, but also can protect heads and necks of the passengers in traffic accidents and reduce injuries in accidents. In particular, two clamping heads are provided, which are respectively used to clamp two insertion rods of a headrest of a vehicle seat, so as to realize the assembly of the side pillows with the vehicle seat.

Since a distance between the two insertion rods of the conventional headrest of the vehicle seat is not adjustable, when a vehicle owner wants to install side pillows on the vehicle seat, a side pillow mounting structure that just fits the distance between the two insertion rods must be customized. That is, the two clamping heads need to be just able to be fixed on the two insertion rods respectively. The cost of customization is high and it is impossible to install the side pillows on other types of seats, so that the practicability is not strong and thus there is room for improvement.

SUMMARY

Accordingly, the disclosure provides a vehicle seat side pillow mounting structure and a seat side pillow assembly, which aims to solve the problems that the conventional side pillow mounting structure has a high customization cost and is impossible to install the side pillows on other types of seats and the practicability thereof is not strong.

In one aspect of the disclosure, a vehicle seat side pillow mounting structure as provided includes: a connection bar, two clamping heads, and locking mechanisms. Two ends of the connection bar are disposed with mounting parts configured for mounting side pillows. The two clamping heads are slidably assembled on the connection bar along a lengthwise direction of the connection bar and configured for clamping and being fixed on two insertion rods of a vehicle headrest. The locking mechanisms are respectively disposed between the clamping heads and the connection bar and configured for locking the clamping heads on or unlocking the clamping heads from the connection bar.

In a preferred embodiment, an outer wall of the connection bar is formed with sliding grooves extending along the lengthwise direction, an end of each of the clamping heads close to the connection bar is disposed with a sliding block slidably engaged with a corresponding one of the sliding grooves, and a length of the sliding block is greater than a width of the corresponding sliding groove.

In a preferred embodiment, the outer wall of the connection bar at two sides of each of the sliding grooves are formed with a plurality of symmetrically-arranged limiting grooves communicated with the sliding groove.

In a preferred embodiment, the locking mechanism includes: a casing, a snap block, and a drive lever. An end surface of the casing close to the connection bar is formed with a first through-groove, and a side wall of the casing adjacent to the end surface formed with the first through-groove is formed with a second through-groove. The snap block is disposed inside the casing, an end of the snap block is snapped with one of the limiting grooves, another end of the snap block is disposed with a limiting plate and connected to an inner wall of a side of the casing opposite to the first through-groove by an elastic element, and the snap block abuts against the one of the limiting grooves under an action of the elastic element. The drive lever is rotatably assembled on an inner wall of the casing, an end of the drive lever is disposed with a support claw for holding the snap block and abutting against the limiting plate, another end of the drive lever is disposed with a pressing block extending outside of the second through-groove, and the support claw drives the snap block to move along a direction away from the one of the limiting grooves when the pressing block is pressed.

In a preferred embodiment, the connection bar is a telescopic bar and includes a first connection rod and a second connection rod; an end of the first connection rod facing toward the second connection rod is disposed with a connection block extending therefrom, an end of the second connection rod facing toward the first connection rod is disposed with a guiding groove fitted with the first connection rod, a spring is disposed in the guiding groove, two ends of the spring respectively abut against a bottom wall of the guiding groove and an end surface of the connection block, clamping mouths of the two clamping heads respectively face toward the two insertion rods of the vehicle headrest, and the two clamping heads respectively abut against the two insertion rods under an action of the spring.

In a preferred embodiment, inner walls of opposite two sides of the guiding groove are formed with guide slots extending along a lengthwise direction of the guiding groove, a bottom wall of each of the guide slot is disposed with a convex strip extending along an axial direction of the guide slot, side walls of the connection block are matched with the guide slots, and a cross-section of the connection block is H-shaped.

In a preferred embodiment, each of the mounting parts is articulated with the connection bar; an end surface of the mounting part facing toward the connection bar is disposed with an annular groove, an side wall of the annular groove is disposed with a plurality of gear slots; an end of the connection bar facing the mounting part is disposed with an annular mounting seat, an end surface of the annular mounting seat is disposed with an assembly groove, an inner wall of the assembly groove is disposed with a through slot penetrating through an outer wall of the annular mounting seat, a movable block is assembled in the annular mounting seat, and a second elastic element is disposed between a bottom wall of the annular mounting seat and the movable block; and the movable block is configured for passing through the through slot and abutting against one of the gear slots under an action of the second elastic element.

In another aspect of the disclosure, a seat side pillow assembly as provided includes the vehicle seat side pillow mounting structure according to any of the above embodiments, and side pillows assembled/installed on the vehicle seat side pillow mounting structure.

Compared with the related art, the embodiments of the disclosure can achieve the following beneficial effects that:

The vehicle seat side pillow mounting structure according to the disclosure includes: a connection bar, two ends of the connection bar being disposed with mounting parts for mounting side pillows; two clamping heads, slidably assembled on the connection bar along a lengthwise direction of the connection bar and for clamping and being fixed on two insertion rods of a vehicle headrest; and locking mechanisms, respectively disposed between the clamping heads and the connection bar and for locking the clamping heads on or unlocking the clamping heads from the connection bar. The disclosure does not require special customization, can reduce the purchase cost, can install the side pillows on other types of seats and has the advantage of strong practicability.

Figure 1:
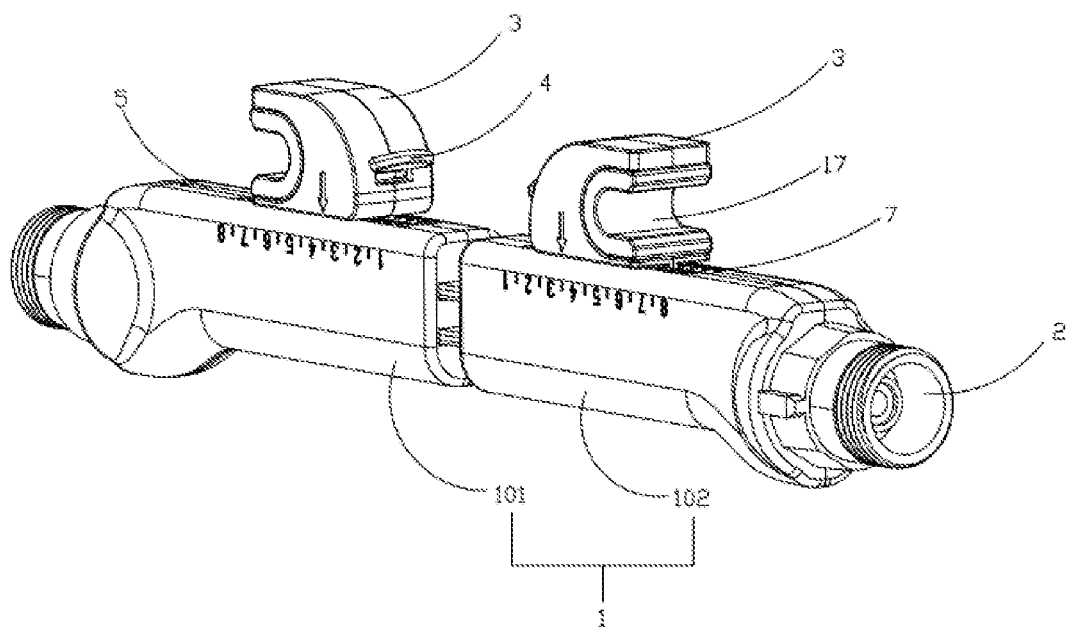
FIG. 1 is a schematic overall structural view of a vehicle seat side pillow mounting structure according to an embodiment of the disclosure.

Reference numerals: 1, connection bar; 101, first connection rod; 102, second connection rod; 103, connection block; 104, guiding groove; 2, mounting part; 3, clamping head; 4, locking mechanism; 41, casing; 42, first through-groove; 43, second through-groove; 44, snap block; 45, limiting plate; 46, drive lever; 461, support claw; 462, pressing block; 47, elastic element; 5, sliding groove; 6, sliding block; 7, limiting groove; 8, guide slot; 9, convex strip; 10, annular groove; 11, gear slot; 12, annular mounting seat; 13, assembly groove; 14, through slot; 15, movable block; 16, second elastic element; 17, clamping mouth.

DETAILED DESCRIPTION OF EMBODIMENTS

Unless otherwise defined, all technical and scientific terms used herein have the same meanings as those commonly understood by those skilled in the technical field of the disclosure. The terms used in the specification of the disclosure herein are only for the purpose of describing specific embodiments and are not intended to limit the disclosure. The terms "including" and "having" in the specification and claims of the disclosure and the above-mentioned description of the drawings and any variations thereof are intended to cover non-exclusive inclusions. The terms "first", "second", etc. in the specification and claims or the above-mentioned drawings of the disclosure are used to distinguish different objects, rather than to describe a specific sequence.

Mentioning "embodiments" herein means that a specific feature, structure, or characteristic described in conjunction with the embodiments may be included in at least one embodiment of the disclosure. The appearance of the phrase in various places in the specification does not necessarily refer to the same embodiment, nor is it an independent or alternative embodiment mutually exclusive with other embodiments. Those skilled in the art explicitly and implicitly understand that the embodiments described herein may be combined with other embodiments.

One aspect of the disclosure provides a vehicle seat side pillow mounting structure, as shown in FIG. 1, including: a connection bar 1, two clamping heads 3, and locking mechanisms 4. Two ends of the connection bar 1 respectively are disposed with mounting parts 2 for mounting side pillows. The two clamping heads 3 are slidably mounted on the connection bar 1 along a lengthwise direction of the connection bar 1 and configured (i.e., structured and arranged) for clamping and being fixed onto two insertion rods of a vehicle headrest. Each of the locking mechanism 4 is arranged between the connection bar 1 and a corresponding one of the clamping heads 3 and configured for locking the corresponding clamping head 3 on the connection bar 1 or unlocking the corresponding clamping head 3 from the connection bar 1.

In the illustrated embodiment, the vehicle seat side pillow mounting structure includes the connection bar 1, the clamping heads 3 and the locking mechanisms 4. In particular, the two ends of the connection bar 1 are disposed with the mounting parts 2 for mounting side pillows (not shown in the drawings), and the mounting part 2 and the side pillow can be screwed together for easy disassembly and assembly. The use of side pillows together with vehicle seats (e.g., automobile seats) can provide supports for sides of heads of passengers during driving, especially during long-distance driving and resting, which not only can relieve riding fatigue, but also can protect heads and necks of the passengers in traffic accidents and reduce injuries in accidents. The clamping heads 3 are two in number, and the two clamping heads 3 are respectively used to clamp two insertion rods of the headrest of a vehicle seat and thereby realize the assembly of the side pillows with the vehicle seat.

Since the distance between the two insertion rods of the conventional headrest of the vehicle seat is not adjustable, when a vehicle owner wants to install side pillows on the vehicle seat, a side pillow mounting structure that just fits the distance between the two insertion rods must be customized. That is, the two clamping heads need to be just able to be fixed on the two insertion rods respectively. The cost of customization is high and it is impossible to install the side pillows on other types of seats, so that the practicability is not strong Accordingly, in order to solve the problem, in the illustrated embodiment, the side pillow mounting structure further includes the locking mechanisms 4, the two clamping heads 3 are slidably mounted/assembled on an outer wall of the connection bar 1 along the lengthwise direction of the connection bar 1, a distance between the two clamping heads 3 can be adjusted according to an actual spacing between two insertion rods of the headrest; and after adjusting the distance between the two clamping heads 3, the locking mechanisms 4 between the connection bar 1 and the respective clamping heads 3 are used to lock the clamping heads 3 on the connection bar 1. The vehicle owner can adjust positions of the clamping heads 3 according to actual situations to mount/install side pillows onto a vehicle seat, without special customization, reducing costs, and can install the side pillows on different types of seats.

Figure 2:
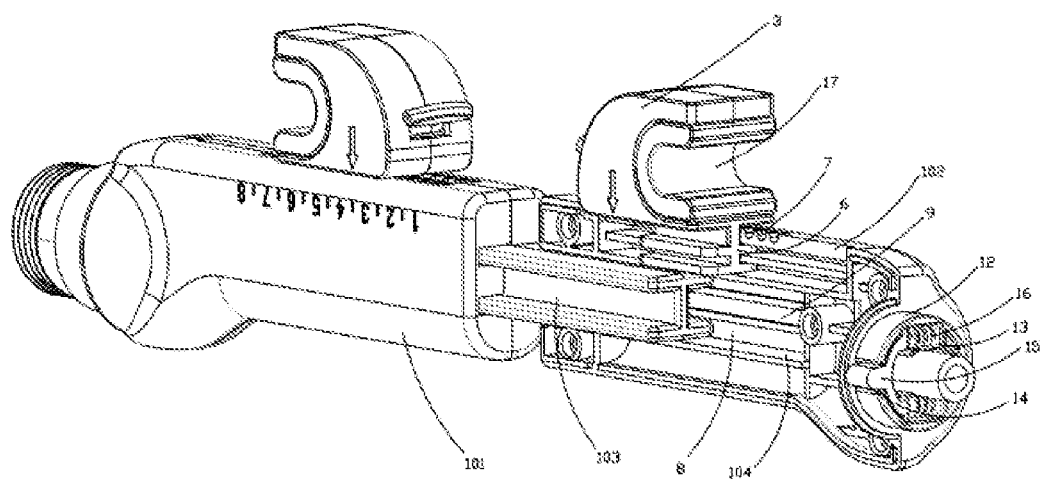
FIG. 2 is a schematic internal structural view of the vehicle seat side pillow mounting structure according to an embodiment of the disclosure.

In a further preferred embodiment of the disclosure, as shown in FIG. 1 and FIG. 2, the outer wall of the connection bar 1 is provided with sliding grooves 5 extending along the lengthwise direction of the connection bar 1, an end of each of the clamping heads 3 close to the connection bar 1 is provided with a sliding block 6 slidably matched/engaged with a corresponding one of the sliding grooves 5, and a length of the sliding block 6 is greater than a width of the corresponding sliding groove 5.

In order to improve the stability when the clamping heads 3 slide on the connecting bar 1, in the illustrated embodiment, the outer wall of the connection bar 1 is provided with the sliding grooves 5 extending along the lengthwise direction of the connection bar 1, the end of each clamping head 3 close to the connection bar 1 is provided with the sliding block 6 slidably matched with the sliding groove 5, and the length of the sliding block 6 is greater than the width of the sliding groove 5 so that the clamping head 3 is limited in a vertical direction.

In a further preferred embodiment of the disclosure, as shown in FIG. 2, the outer wall of the connection bar 1 at two sides of the sliding grooves 5 are formed with symmetrically-arranged limiting slots 7 communicated with the sliding grooves 5.

In the illustrated embodiment, by forming symmetrically-arranged limiting slots 7 on the outer wall of the connection bar 1 at two sides of the sliding grooves 5 and communicated with the sliding grooves 5, and a spacing between each adjacent two of the limiting slots 7 is the same, it is convenient to control the degree of movement of each the clamping head 3 on the connection bar 1. In another embodiment, the connection bar 1 is further formed with scales.

Figure 3:
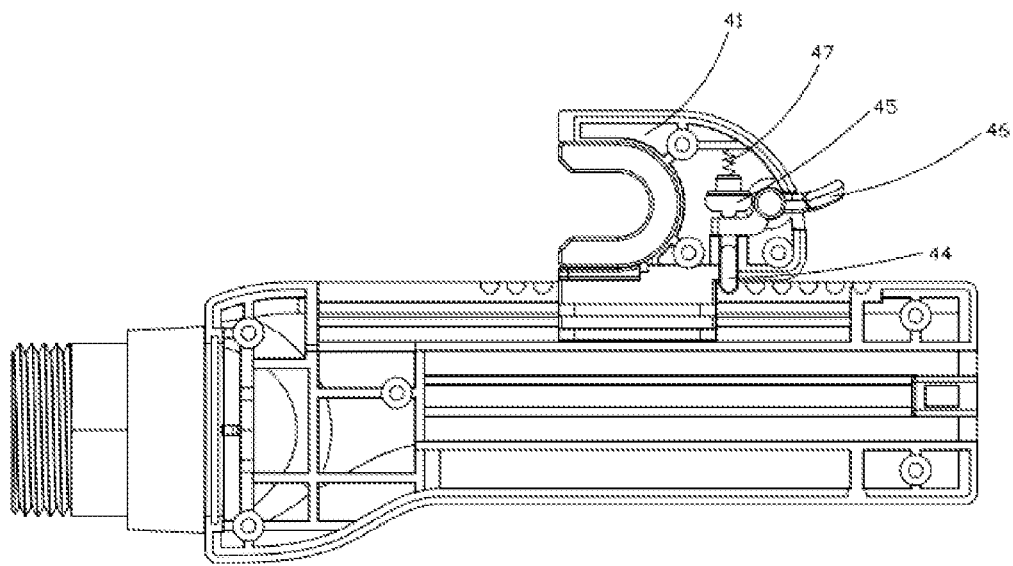
FIG. 3 is another schematic internal structural view of the vehicle seat side pillow mounting structure according to an embodiment of the disclosure.
Figure 4:
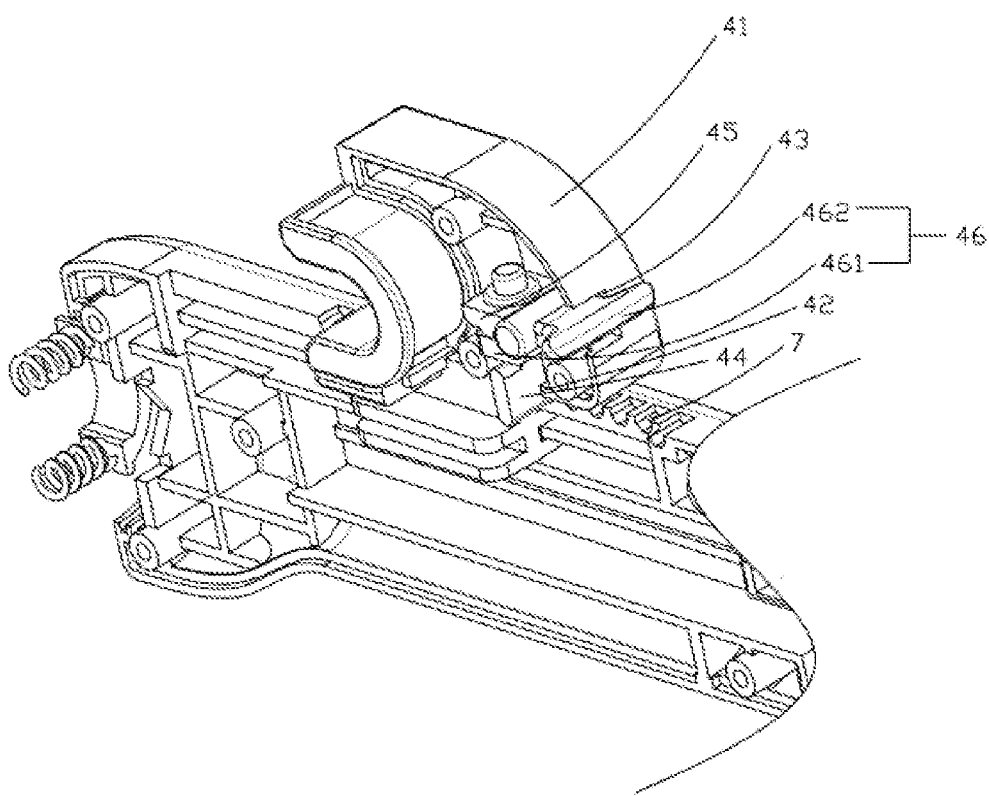
FIG. 4 is still another schematic internal structural view of the vehicle seat side pillow mounting structure according to an embodiment of the disclosure
Figure 5:
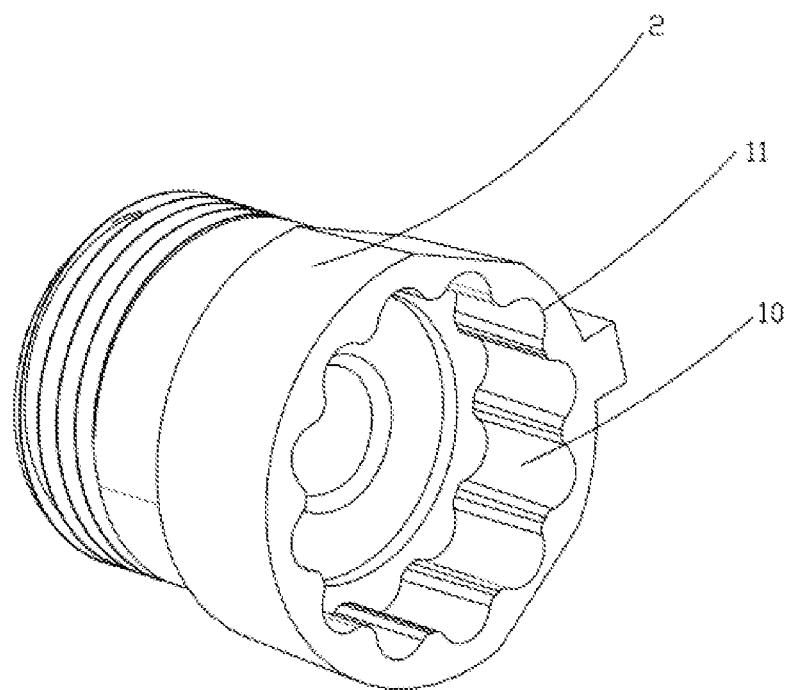
FIG. 5 is a schematic structural view of a mounting part of the vehicle seat side pillow mounting structure according to an embodiment of the disclosure.

In a further preferred embodiment, as shown in FIG. 2 through FIG. 4, each the locking mechanism 4 includes a casing 41, a snap block 44, and a drive lever 46. An end surface of the casing 41 close to the connection bar 1 is provided with a first through-groove 42, and a sidewall of the casing 41 adjacent to the end surface provided with the first through-groove 42 is provided with a second through-groove 43. The snap block 44 is disposed inside the casing 41, an end of the snap block 44 is snapped with one of the limiting slots 7, and the other end of the snap block 44 is provided with limiting plate 45 and connected to an inner wall of a side of the casing 41 opposite to the first through-groove 42 via an elastic element 47. The snap block 44 abuts against the limiting slot 7 under the action of the elastic element 47. The driver lever 46 is rotatably installed on an inner wall of the casing 41. An end of the driver lever 46 is provided with a support claw 461 for holding the snap block 44 and being abutted against the limiting plate 45, and the other end of the drive lever 46 is provided with a pressing block 462 extending outside of the second through-groove 43. When the pressing block 462 is pressed, the support claw 461 drive the snap block 44 to move along a direction away from the limiting slot 7.

In the illustrated embodiment, the locking mechanism 4 includes the casing 41, the snap block 44 and the drive lever 46. Specifically, two adjacent sidewalls of the casing 41 are provided with the first through-groove 42 and the second through-groove 43 respectively. The snap block 44 is disposed inside the casing 41, one end thereof is snapped with the limiting slot 7, and the other end thereof is provided with the limiting plate 45 and connected to the inner wall of the side of the casing 41 opposite to the first through-groove 42 by the elastic element 47 (e.g., spring or elastic sheet). The snap block 44 can abut against inside of the limiting slot 7 under the elastic force of the elastic element 47, and thereby the clamping head is locked on the connection bar 1. The drive lever 46 is rotatably assembled on the inner wall of the casing 41, one end of the drive lever 46 is provided with the support claw 461 capable of abutting against a bottom wall of the limiting plate 45 and thereby holding the snap block 44, the other end of the drive lever 46 is provided with the pressing block 462 extending outside of the second through-groove 43 for an operator to press. When the pressing block 462 is pressed, the support claw 461 drives the snap block 44 to move along the direction away from the limiting groove 7, thereby unlocking the clamping head 3 from the connection bar 1.

In a further preferred embodiment of the disclosure, as shown in FIG. 2 through FIG. 4, the connection bar 1 is a telescopic bar and includes a first connection rod 101 and a second connection rod 102. An end of the first connection rod 101 facing toward the second connection rod 102 is provided with a connection block 103 extending therefrom, an end of the second connection rod 102 facing toward the first connection rod 101 is provided with a guiding groove 104 matched with the first connection rod 101, a spring is disposed inside the guiding groove 104, two ends of the spring respectively abut against a bottom wall of the guiding groove 104 and an end surface of the connection block 103. Clamping mouths 17 of the two clamping heads 3 face toward two insertion rods of a vehicle headrest respectively, and abut against the two insertion rods respectively under the action of the spring.

In order to allow the two clamping heads to be more accurately clamped on the two insertion rods of the headrest, in the illustrated embodiment, the connection bar 1 is designed as a telescopic bar and specifically includes the first connection rod 101 and the second connection rod 102. The end of the first connection rod 101 facing toward the second connection rod 102 is provided with the connection block 103 extending therefrom, the end of the second connection rod 102 facing toward the first connection rod 101 is provided with the guiding groove 104 matched with the first connection rod 101, the guiding groove 104 is disposed with the spring (not shown in the drawing) therein, and the two ends of the spring respectively abut against the bottom wall of the guiding groove 104 and the end surface of the connection block 103. The connection block 103 has states of being completely placed in or extending out of the guiding groove 104 so as to adjust a length of the connection bar 1, and when in use, a position on the connection bar 1 of any one of the clamping heads 3 can be firstly fixed, the first connection rod 101 and the second connection rod 102 are pushed close to each other by pressing/squeezing the spring, the two clamping heads 3 are placed between the two insertion rods, a relative distance between the two clamping heads 3 is adjusted to make the clamping mouths 17 of the two clamping heads 3 be aligned with the insertion rods and then the spring is released, the two clamping heads 3 are respectively installed onto the insertion rods. Since the two clamping heads 3 are respectively subjected to elastic forces of the spring and acting forces of the insertion rods, the elastic force and the acting force act on the clamping head 3 in opposite directions, so that the two clamping heads 3 can be fixed on the insertion rods, thereby making the side pillows of the disclosure be fixed on the vehicle seat.

In a further preferred embodiment of the disclosure, as shown in FIG. 2, inner walls of opposite sides of the guiding groove 104 are provided with guide slots 8 extending along a lengthwise direction of the guiding groove 104. A bottom wall of each the guide slot 8 is formed with a convex strip extending along an axial direction of the guide slot 8. Sidewalls of the connection block 103 fit with the guide slots 8, and a cross-section of the connection block is H-shaped.

In the illustrated embodiment, by forming the guide slots 8 on the inner walls of the opposite sides of the guiding groove 104 and along the lengthwise direction of the guiding groove 104, the bottom wall of each the guide slot 8 is formed with the convex strip extending along the axial direction of the guide slot 8, the sidewalls of the connection block 103 fit with the guide slots 8, and the cross-section of the connection block is H-shaped, the stability associated with the first connection rod 101 and the second connection rod 102 when being stretched can be improved, the H-shaped structure can make the structure more stable and more resistant to wear, and the service life is prolonged consequently.

In a further preferred embodiment of the disclosure, as shown in FIG. 2 through FIG. 5, the mounting parts 2 are articulated with the connection bar 1. An end surface of each the mounting part 2 facing toward the connection bar 1 is provided with an annular groove 10. A side wall of the annular groove 10 is provided with multiple (i.e., more than one) gear slots 11. An end of the connection bar 1 facing toward the mounting part 2 is provided with an annular mounting seat 12, an end surface of the annular mounting seat 12 is formed with an assembly groove 13, and an inner wall of the assembly groove 13 is formed with a through slot 14 penetrating through an outer wall of the annular mounting seat 12. A movable block 15 is movably assembled in the annular mounting seat 12. A bottom wall of the annular mounting seat and the movable block 15 have a second elastic element 16 arranged therebetween. The movable block 15 can pass through the through slot 14 and abut against one of the gear slots 11 under the action of the second elastic element 16.

In the illustrated embodiment, the mounting parts 2 are articulated with the connection bar 1, so that the side pillows mounted on the mounting parts 2 can be rotated with respect to the connection bar 1, angles and positions of the side pillows can be adjusted according to heights and usage habits of different passengers to improve the feeling of use, and the side pillows can be rotated to the rear side of the vehicle seat when not in use and thus the side pillows do not take up space.

Specifically, the annular groove 10 is disposed on the end surface of each the mounting part 2 facing toward the connection bar 1, and multiple gear slots 11 are disposed on the side wall of the annular groove 10. Moreover, the annular mounting seats 12 are respectively disposed on the ends of the connection bar 1 facing toward the respective mounting parts 2, the assembly groove 13 is formed on the end surface of each the annular mounting seat 12, and the through slot 14 is formed on the inner wall of the assembly groove 13 and penetrating through the outer wall of the annular mounting seat 12. The movable block 15 is movably assembled in the annular mounting seat 12, and the second elastic element 16 (e.g., spring or elastic sheet) is disposed between the bottom wall of the annular mounting seat and the movable block 15. when the mounting part 2 is rotated with respect to the connection bar 1, the movable block 15 is pressed to be embedded in the assembly groove 13; and when the mounting part 2 is stopped being rotated, the movable block 15 is ejected out of the through slot 14 under the action of the elastic force of the second elastic element 16 and is snapped in current one of the gear slots 11, thereby realizing the locking of the mounting part 2 and the connection bar 1.

In another aspect of the disclosure, a seat side pillow assembly is provided. As shown in FIG. 1, the seat side pillow assembly includes the vehicle seat side pillow mounting structure as described above and side pillows assembled on the vehicle seat side pillow mounting structure.

It should be noted that for the foregoing embodiments, for the sake of simple description, each of them is expressed as a series of action combinations, but those skilled in the art should know that the disclosure is not limited by the described sequence of actions. Because according to the disclosure, some steps may be performed in other order or at the same time. Secondly, those skilled in the art should also be aware that the embodiments described in the specification are all preferred embodiments, and the actions and modules involved are not necessarily required by the disclosure.

In the several embodiments provided in the disclosure, it should be understood that the disclosed device may be implemented in other ways. For example, the device embodiments described above are only illustrative. For example, the division of the above-mentioned units is only a logical function division, and there may be other divisions in actual implementation, for example, multiple units or components can be combined or integrated into another system, or some features can be ignored, or not implemented. In addition, the illustrated or discussed mutual coupling or communication connection may be through some interfaces; and the indirect coupling or communication connection between devices or units may be in telecommunication or other forms.

The units described above as separate components may or may not be physically separated, and the components illustrated as units may or may not be physical units, that is, they may be located in one place, or they may be distributed on multiple network units. Some or all of the units may be selected according to actual needs to achieve the objectives of the solutions of the embodiments.

The above embodiments are only used to illustrate the technical solution of the disclosure, but not to limit the protection scope of the disclosure. Apparently, the described embodiments are only part of embodiments of the disclosure, rather than all the embodiments. Based on these described embodiments, all other embodiments obtained by those of ordinary skill in the art without creative effort shall fall within the scope of protection of the disclosure. Although the disclosure has been described in detail with reference to the above-mentioned embodiments, those of ordinary skill in the art can still combine, add, delete, or make other adjustments to the features in the various embodiments of the disclosure without any creative work under the condition of no conflict, so as to obtain other different technical solutions that do not deviate from the concept of the disclosure in essence, and these technical solutions also fall within the scope of protection of the disclosure.

What is claimed is:

1. A vehicle seat side pillow mounting structure, comprising:
   a connection bar, wherein two ends of the connection bar are disposed with mounting parts configured for mounting side pillows;
   two clamping heads, slidably assembled on the connection bar along a lengthwise direction of the connection bar and configured for clamping and being fixed on two insertion rods of a vehicle headrest; and
   locking mechanisms, respectively disposed between the clamping heads and the connection bar and configured for locking the clamping heads on or unlocking the clamping heads from the connection bar;
   wherein an outer wall of the connection bar is formed with sliding grooves extending along the lengthwise direction, an end of each of the clamping heads close to the connection bar is disposed with a sliding block slidably engaged with a corresponding one of the sliding grooves, and a length of the sliding block is greater than a width of the corresponding sliding groove;
   wherein the outer wall of the connection bar at two sides of each of the sliding grooves are formed with a plurality of symmetrically-arranged limiting grooves communicated with the sliding groove; and wherein the locking mechanism comprises:

a casing, wherein an end surface of the casing close to the connection bar is formed with a first through-groove, and a side wall of the casing adjacent to the end surface formed with the first through-groove is formed with a second through-groove;

a snap block, disposed inside the casing, wherein an end of the snap block is snapped with one of the limiting grooves, another end of the snap block is disposed with a limiting plate and connected to an inner wall of a side of the casing opposite to the first through-groove by a first elastic element, and the snap block abuts against the one of the limiting grooves under an action of the first elastic element; and a drive lever, rotatably assembled on an inner wall of the casing, wherein an end of the drive lever is disposed with a support claw for holding the snap block and abutting against the limiting plate, another end of the drive lever is disposed with a pressing block extending outside of the second through-groove, and the support claw drives the snap block to move along a direction away from the one of the limiting grooves when the pressing block is pressed.

2. The vehicle seat side pillow mounting structure as claimed in claim 1, wherein the connection bar is a telescopic bar and comprises a first connection rod and a second connection rod;

an end of the first connection rod facing toward the second connection rod is disposed with a connection block extending therefrom, an end of the second connection rod facing toward the first connection rod is disposed with a guiding groove fitted with the first connection rod, a spring is disposed in the guiding groove, two ends of the spring respectively abut against a bottom wall of the guiding groove and an end surface of the connection block, clamping mouths of the two clamping heads respectively face toward the two insertion rods of the vehicle headrest, and the two clamping heads respectively abut against the two insertion rods under an action of the spring.

3. The vehicle seat side pillow mounting structure as claimed in claim 2, wherein inner walls of opposite two sides of the guiding groove are formed with guide slots extending along a lengthwise direction of the guiding groove, a bottom wall of each of the guide slot is disposed with a convex strip extending along an axial direction of the guide slot, side walls of the connection block are matched with the guide slots, and a cross-section of the connection block is H-shaped.

4. The vehicle seat side pillow mounting structure as claimed in claim 1, wherein each of the mounting parts is articulated with the connection bar;

an end surface of the mounting part facing toward the connection bar is disposed with an annular groove, an side wall of the annular groove is disposed with a plurality of gear slots;

an end of the connection bar facing toward the mounting part is disposed with an annular mounting seat, an end surface of the annular mounting seat is disposed with an assembly groove, an inner wall of the assembly groove is disposed with a through slot penetrating through an outer wall of the annular mounting seat, a movable block is assembled in the annular mounting seat, and a second elastic element is disposed between a bottom wall of the annular mounting seat and the movable block; and the movable block is configured for passing through the through slot and abutting against one of the gear slots under an action of the second elastic element.

5. A seat side pillow assembly, comprising: the vehicle seat side pillow mounting structure as claimed in claim 1.

6. The seat side pillow assembly as claimed in claim 5, wherein the connection bar is a telescopic bar and comprises a first connection rod and a second connection rod; an end of the first connection rod facing toward the second connection rod is disposed with a connection block extending therefrom, an end of the second connection rod facing toward the first connection rod is disposed with a guiding groove fitted with the first connection rod, a spring is disposed in the guiding groove, two ends of the spring respectively abut against a bottom wall of the guiding groove and an end surface of the connection block, clamping mouths of the two clamping heads respectively face toward the two insertion rods of the vehicle headrest, and the two clamping heads respectively abut against the two insertion rods under an action of the spring.

7. The seat side pillow assembly as claimed in claim 6, wherein inner walls of opposite two sides of the guiding groove are formed with guide slots extending along a lengthwise direction of the guiding groove, a bottom wall of each of the guide slot is disposed with a convex strip extending along an axial direction of the guide slot, side walls of the connection block are matched with the guide slots, and a cross-section of the connection block is H-shaped.

8. The seat side pillow assembly as claimed in claim 5, wherein each of the mounting parts is articulated with the connection bar;

an end surface of the mounting part facing toward the connection bar is disposed with an annular groove, an side wall of the annular groove is disposed with a plurality of gear slots;

an end of the connection bar facing toward the mounting part is disposed with an annular mounting seat, an end surface of the annular mounting seat is disposed with an assembly groove, an inner wall of the assembly groove is disposed with a through slot penetrating through an outer wall of the annular mounting seat, a movable block is assembled in the annular mounting seat, and a second elastic element is disposed between a bottom wall of the annular mounting seat and the movable block; and the movable block is configured for passing through the through slot and abutting against one of the gear slots under an action of the second elastic element.

* * * * *